United States Patent
Yeh et al.

(10) Patent No.: US 8,143,542 B2
(45) Date of Patent: Mar. 27, 2012

(54) KEYPAD ASSEMBLY AND ELECTRONIC DEVICE USING SAME

(75) Inventors: Wang-Hung Yeh, Taoyuan (TW); Chung-Yu Liu, Taoyuan (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 235 days.

(21) Appl. No.: 12/610,497

(22) Filed: Nov. 2, 2009

(65) Prior Publication Data

US 2010/0288613 A1 Nov. 18, 2010

(30) Foreign Application Priority Data

May 14, 2009 (CN) .......................... 2009 1 0302317

(51) Int. Cl.
*H01H 13/70* (2006.01)
(52) U.S. Cl. ........................................ 200/343
(58) Field of Classification Search .............. 200/5 A, 200/343; 400/472; 341/22
See application file for complete search history.

(56) References Cited

U.S. PATENT DOCUMENTS

| | | | | |
|---|---|---|---|---|
| 4,315,114 A * | 2/1982 | Monti, Jr. | ....................... | 200/5 A |
| 4,582,967 A * | 4/1986 | Brumit et al. | .................. | 200/5 A |
| 6,027,267 A * | 2/2000 | Yokobori | ....................... | 400/479 |
| 7,989,716 B2 * | 8/2011 | Yeh et al. | ....................... | 200/5 A |
| 2005/0274595 A1 * | 12/2005 | Pihlaja | .......................... | 200/512 |
| 2010/0309026 A1 * | 12/2010 | Liu et al. | ......................... | 341/22 |

* cited by examiner

*Primary Examiner* — Edwin A. Leon
*Assistant Examiner* — Vanessa Girardi
(74) *Attorney, Agent, or Firm* — Altis Law Group, Inc.

(57) ABSTRACT

A keypad assembly is used for an electronic device. The keypad assembly includes a support member, a plurality of key strips and a plurality of elastic members. The support member defines a plurality of openings and a plurality of cantilever plates, each cantilever plate extending into a corresponding opening. The key strips are received in the openings. Each key strip defines a first slot in which each cantilever plate is received. Each elastic member supports one of the key strips and provides a force extending one portion of the key strips out of its corresponding opening.

12 Claims, 5 Drawing Sheets

KEYPAD ASSEMBLY AND ELECTRONIC DEVICE USING SAME

CROSS-REFERENCE TO RELATED APPLICATIONS

This application is related to two co-pending U.S. patent applications Ser. Nos. 12/610,491 and 12/610,494, both entitled "KEYPAD ASSEMBLY AND ELECTRONIC DEVICE USING SAME", by CHUNG-YU LIU et al. Such applications have the same assignee as the instant application and have been concurrently filed herewith. The disclosure of the above identified applications is incorporated herein by reference.

BACKGROUND

1. Technical Field

The present disclosure relates to keypad assemblies and, particularly, to a keypad assembly used in an electronic device.

2. Description of Related Art

With the development of wireless communication and information processing technologies, portable electronic devices, such as mobile telephones and personal digital assistants, are now widely used. These electronic devices typically have a keypad assembly as an input terminal.

Keypad assemblies used in portable electronic devices are becoming smaller and thinner. A conventional keypad assembly includes a plurality of keys. The keys are positioned coplanar with each other and are arranged very close together. Accidental keystrokes are common and easily made. Additionally, use of the keypad may be uncomfortable.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present keypad assembly. Moreover, in the drawings, like reference numerals designate corresponding parts throughout the several views, in which.

DETAILED DESCRIPTION

Figure 1:
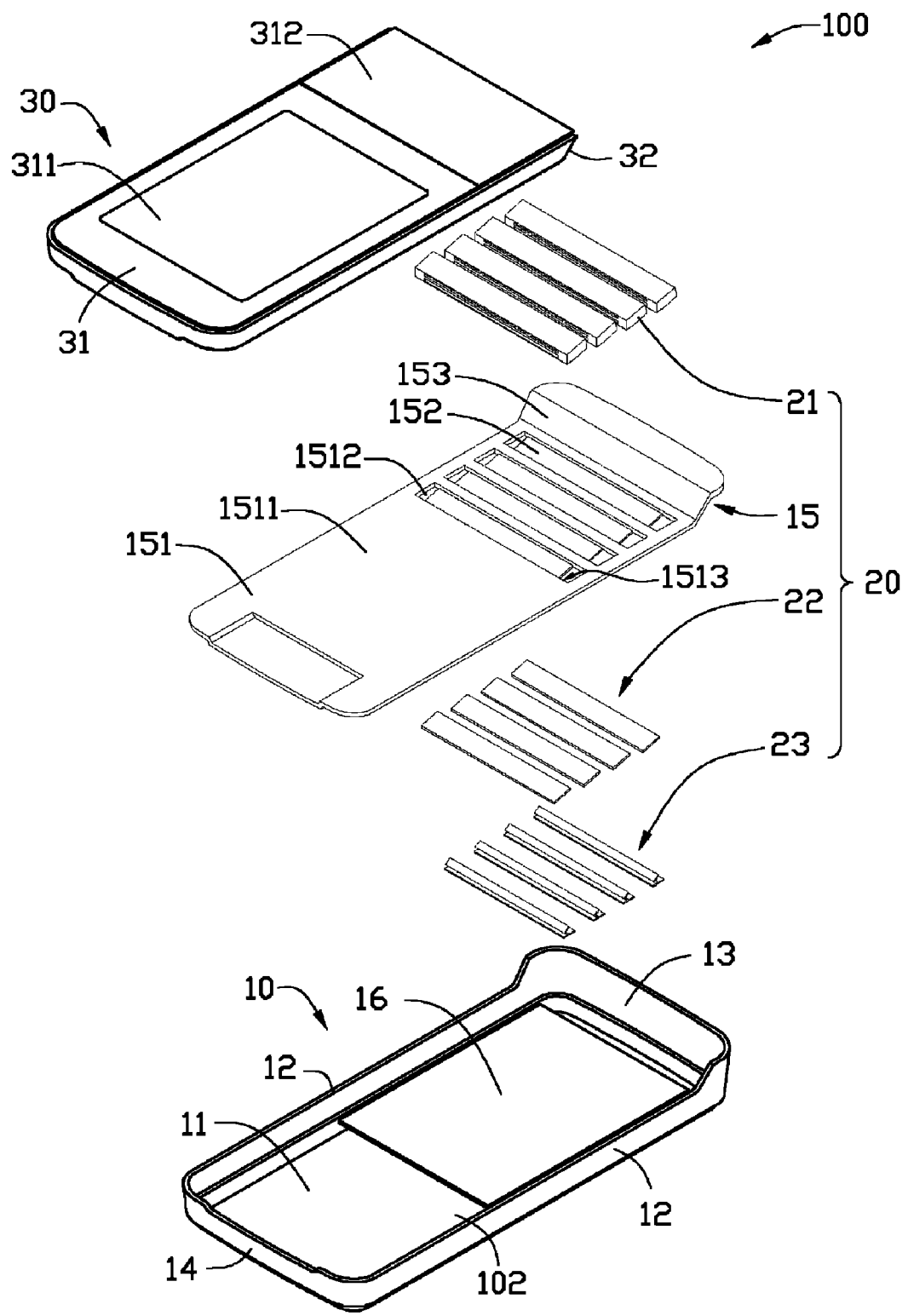
FIG. 1 is an exploded, isometric view of an exemplary keypad assembly used in an electronic device.

FIG. 1 is an exploded, isometric view of an exemplary keypad assembly 20 used in an electronic device 100, such as a slidable mobile phone.

The electronic device 100 includes a housing body 10 and a cover member 30. The housing body 10 includes a bottom portion 11, two sidewalls 12, a first end wall 13 and a second end wall 14, together defining a cavity 102. The first end wall 13 is higher than the second end wall 14. A printed circuit board 16 is received in the cavity 102, and positioned in a bottom portion 11. The cover member 30 is slidably attached to the housing body 10 by a slide mechanism (not shown).

The cover member 30 includes a panel 31 and an end portion 32. A display 311 is secured to the panel 31.

The keypad assembly 20 includes a support member 15, four key strips 21, four touch panels 22, and four elastic members 23.

Figure 2:
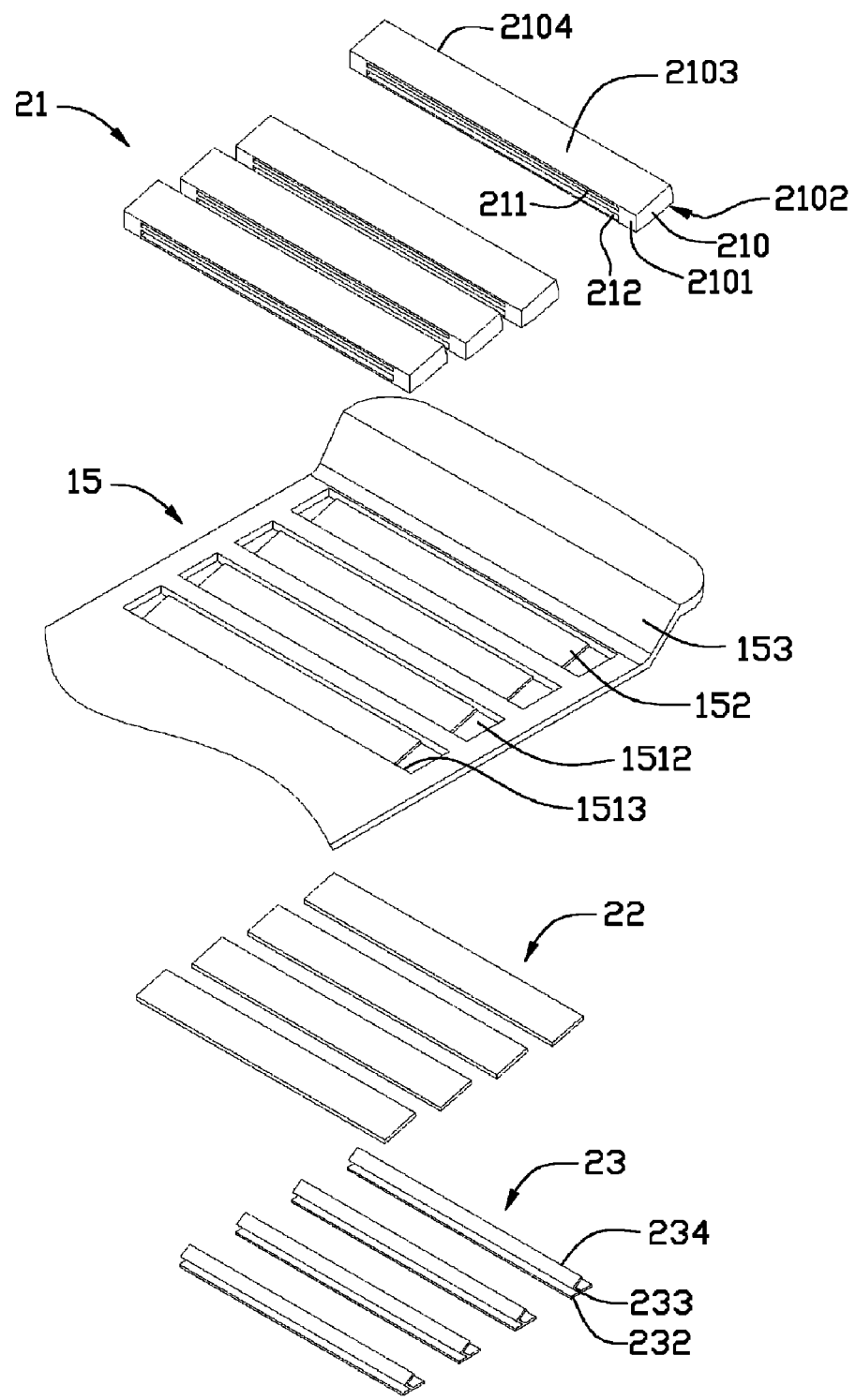
FIG. 2 is an enlarged view of the keypad assembly shown in FIG. 1.

The support member 15 corresponds in size to the housing body 10 and may be supported by the sidewalls 12 and end walls 13, 14 of the housing body 10 and cover the cavity 102. The support member 15 includes a main body 151 and an extending portion 153 formed at one end of the main body 151. The main body 151 includes an upper surface 1511 and defines four openings 1512 adjacent to the extending portion 153. The openings 1512 are arranged in parallel. The extending portion 153 first extends at an angle and then parallel to the main body 10. The angled portion of the extending portion 153 subtends an obtuse angle with the main body 151. Referring to FIG. 2, a cantilever plate 152 extends into each opening 1512 from a sidewall 1513. The cantilever plate 152 is angled relative to the main body 151, and may flex up and down in its corresponding opening 1512. The cantilever plate 152 may be formed by punch, injection molding, ultrasonic welding, or other means.

Each key strip 21 is engaged in one of the openings 1512. Each key strip 21 includes a pressing surface 2103, a back surface 2102, a first side surface 2101 and a second side surface 2104. The first side surface 2101 defines a first slot 211 and a second slot 212. Each cantilever plate 152 and each touch panel 22 are respectively received in the first slot 211 and the second slot 212. The touch panels 22 are further electrically connected to the printed circuited board 16. Each key strip 21 may be divided into three or four keys corresponding to e,g, different groups of numbers or words.

Each elastic member 23 can be made of plastic and has a length equal to the length of a corresponding key strip 21. Each elastic member 23 includes a fixed plate 232 integrally formed with a deformable plate 233. Each deformable plate 233 is substantially V-shaped, and one end of each deformable plate 233 extends from a middle portion of the fixed plate 232. Each deformable plate 233 has a distal end 234 supporting a corresponding key strip 21.

Figure 3:
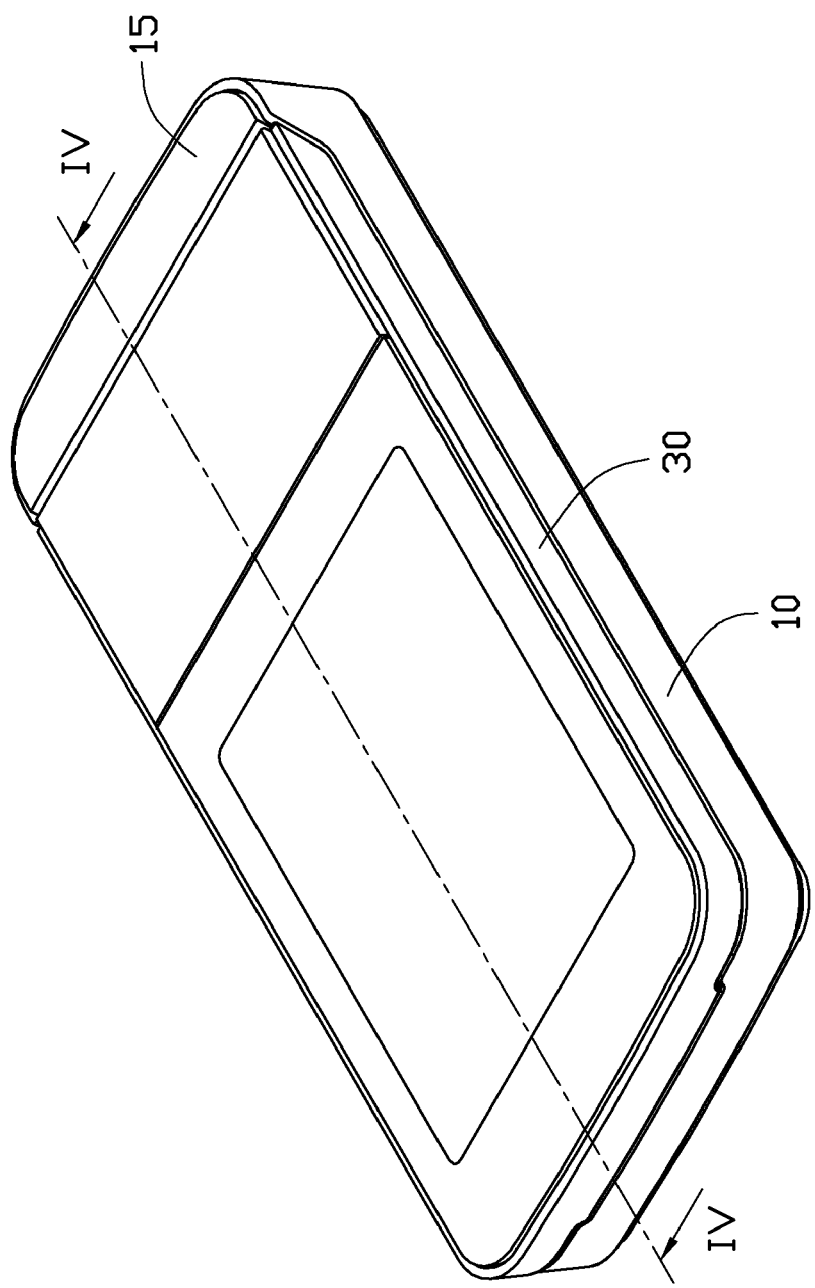
FIG. 3 is an assembled, isometric view of an exemplary electronic device utilizing a keypad assembly.
Figure 4:
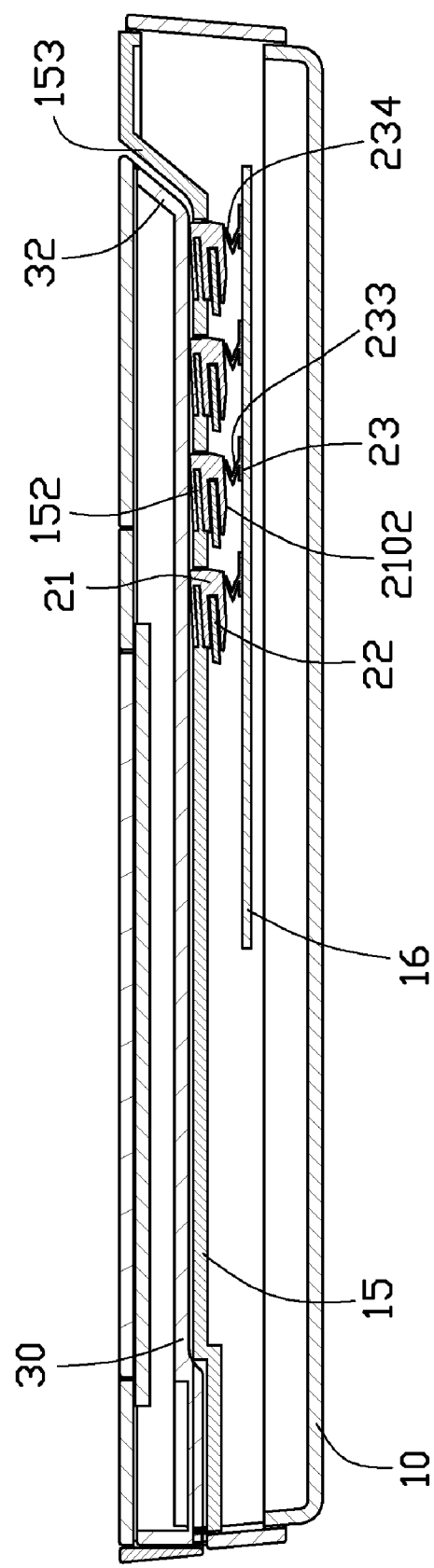
FIG. 4 is a cross section of the keypad assembly shown in FIG. 3 taken along line IV-IV.

In FIGS. 3 and 4, when the keypad assembly 20 is assembled to the housing body 10, the fixed plate 232 of each elastic member 23 is fixed to the printed circuit board 16 at a location corresponding to a corresponding opening 1512. Each touch panel 22 is positioned in a corresponding second slot 212 of each key strip 21. Then, each key strip 21 with the touch panel 22 is assembled into the opening 1512 of the support plate 15, and the cantilever plate 152 is received in the first slot 211 of each key strip 21. Since the cantilever plate 152 is angled relative to the main body 151, the key strip 21 is also angled in the opening 1512, and one end of each key strip 21 protrudes from its corresponding opening 1512.

The support plate 15 with the key strips 21 and the touch panels 22 is secured to the housing body 10. The extending portion 153 abuts the first end wall 13 of the housing body 10. The fixed plates 232 are fixed to locations on the printed circuited board 16 corresponding to the key strips 21. The distal end 234 of the deformable plate 233 abuts its corresponding key strip 21. The elastic members 23 provide an elastic force biasing the key strip 21 to extend outside its corresponding opening 1512. The cover member 30 is slidably attached to the housing body 10. As the cover member 30 is slid towards the closed position, the end portion 32 forces the key strips 21 downward toward the elastic members 23 to bend the deformable plates 233 until the key strips 21 are completely received in their respective openings 1512.

Figure 5:
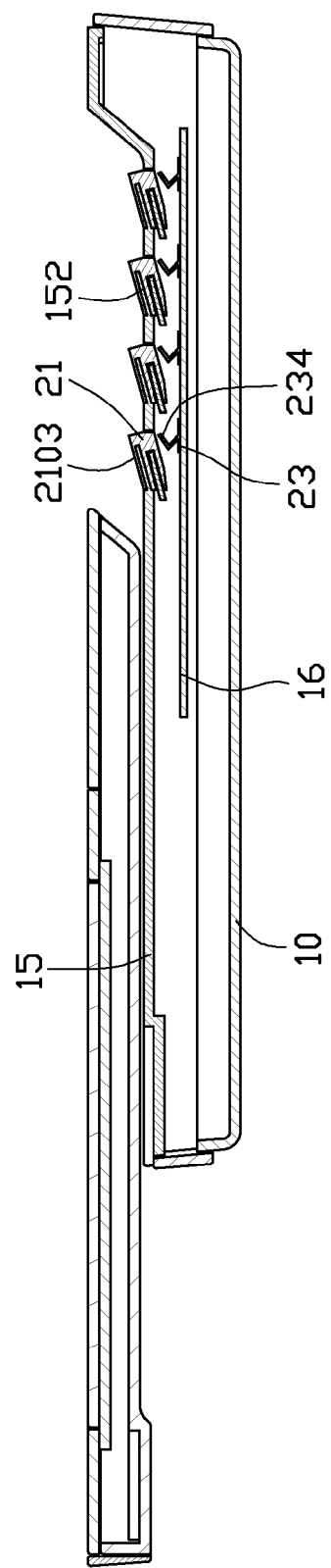
FIG. 5 is similar to FIG. 4, but in an open position.

Referring to FIG. 5, when the cover member 30 is slid towards the open position, the cover member 30 exposes the keypad assembly 20. The deformable plates 233 return to their original state by elastic force to cause a portion of each of the key strips 21 to protrude from its respective opening 1512. Thus, the key strips 21 are accurately, easily and comfortably operated, with no increase in size or weight of the electronic device.

It is understood that the deformable plate 233 of the elastic member 23 may adopt varying shapes.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad assembly for an electronic device, the keypad assembly comprising:
   a support member defining a plurality of openings and a plurality of cantilever plates, each cantilever plate extending into a corresponding opening, the cantilever plates integrally formed with the support member;
   a plurality of key strips, each key strip received in one of the openings, each key strip defining a first slot and a second slot, each cantilever plate being received in one of the first slots;
   a plurality of touch panels, each touch panel attached to a corresponding second slot of each key strip; and
   a plurality of elastic members, each elastic member supporting one of the key strips and providing a force to extend a portion of the key strips out of its corresponding opening.

2. The keypad assembly as claimed in claim 1, wherein each cantilever plate is angled relative to the support member.

3. The keypad assembly as claimed in claim 1, wherein each elastic member includes a fixed plate integrally formed with a deformable plate, and each deformable plate is V-shaped.

4. The keypad assembly as claimed in claim 3, wherein one end of each deformable plate extends from a middle portion of the fixed plate.

5. The keypad assembly as claimed in claim 1, wherein the support member includes a main body and an extending portion formed at one end of the main body, adjacent to where the main body defines the openings.

6. The keypad assembly as claimed in claim 5, wherein the openings are parallel to each other.

7. The keypad assembly as claimed in claim 5, wherein the extending portion first extends at an angle, and then extends parallel to the main body; the angled portion of the extending portion forming an obtuse angle with the main body.

8. An electronic device, comprising:
   a housing body defining a plurality of openings and forming a plurality of cantilever plates;
   a plurality of key strips, each key strip received in one of the openings each key strip defining a first slot and a second slot, each cantilever plate being received in one of the first slots; and
   a plurality of elastic members, each elastic member abutting a corresponding key strip;
   a plurality of touch panels, each touch panel being received in one of the second slots; and
   a cover member slidably attached to the housing body wherein when the cover member is moved in the opening direction, the elastic members provide a force to extend a portion of the key strips out of their receiving grooves.

9. The electronic device as claimed in claim 8, further comprising a support member including a main body and an extending portion formed at one end of the main body; the main body defines the openings adjacent to the extending portion.

10. The electronic device as claimed in claim 9, wherein the extending portion first extends at an angle, and then parallel to the main body; the angled portion of the extending portion forming an obtuse angle with the main body.

11. The electronic device as claimed in claim 8, wherein each elastic member includes a fixed plate integrally formed with a deformable plate; each deformable plate is V-shaped.

12. The electronic device as claimed in claim 11, wherein one end of each deformable plate extends from a middle portion of the fixed plate.

* * * * *